United States Patent
Ghosh et al.

(10) Patent No.: US 7,483,555 B2
(45) Date of Patent: Jan. 27, 2009

(54) METHOD AND SYSTEM FOR DIGITAL IMAGE PROCESSING

(75) Inventors: Pinaki Ghosh, Bangalore (IN); Preethish Kumar M, Kasaragod (IN)

(73) Assignee: General Electric Company, Schenectady, NY (US)

( * ) Notice: Subject to any disclaimer, the term of this patent is extended or adjusted under 35 U.S.C. 154(b) by 930 days.

(21) Appl. No.: 11/023,951

(22) Filed: Dec. 28, 2004

(65) Prior Publication Data

US 2006/0147098 A1    Jul. 6, 2006

(51) Int. Cl.
*G06K 9/00* (2006.01)
(52) U.S. Cl. ...................... 382/128; 382/130
(58) Field of Classification Search ............. 382/128, 382/130–132; 600/437, 458
See application file for complete search history.

(56) References Cited

U.S. PATENT DOCUMENTS

| | | | |
|---|---|---|---|
| 6,436,049 B1* | 8/2002 | Kamiyama et al. | 600/458 |
| 6,450,962 B1* | 9/2002 | Brandl et al. | 600/458 |
| 6,501,272 B1* | 12/2002 | Haacke et al. | 324/306 |
| 6,807,247 B2* | 10/2004 | Krishnan et al. | 378/4 |
| 7,024,027 B1* | 4/2006 | Suri et al. | 382/130 |
| 2006/0020202 A1* | 1/2006 | Mathew et al. | 600/437 |

* cited by examiner

*Primary Examiner*—Tom Y Lu
(74) *Attorney, Agent, or Firm*—Peter Vogel, Esq.; Jean Tibbetts, Esq.; Michael G. Smith, Esq.

(57) ABSTRACT

In an embodiment, a method of digital image processing is provided wherein the method includes the actions of (i) segmenting a data set of an image to be processed, based on predetermined conditions (ii) generating a maximum intensity projection of the segmented data set (iii) closing-by-reconstruction of said data set in parallel to action (ii) (iv) combining the result of action (i) with result of action (iii) by a logical AND function, and (v) replacing pixels of undesired intensity in result of action (ii) by pixels of desired intensity from result of action (iv).

20 Claims, 4 Drawing Sheets

METHOD AND SYSTEM FOR DIGITAL IMAGE PROCESSING

FIELD OF THE INVENTION

This invention relates generally to methods and systems for image processing, and more particularly, to a method and system for digital image processing in medical imaging.

BACKGROUND OF THE INVENTION

In medical imaging, to visualize in vivo elements such as blood vessels, spine, stenosis in blood vessels, etc, radiologists generally use maximum intensity projection (MIP) technique, for processing data set of images of such in vivo elements.

The procedure using maximum intensity projection for image processing is not only cumbersome but also time consuming.

For image processing in medical imaging, especially for visualization of a dark region in a bright surrounding or vice versa, known systems do not provide for a procedure wherein the output image clearly (viewably) depicts the dark region in the brighter surrounding or vice versa.

Thus, there is a need in the art for visualizing a dark region in a bright surrounding or vice versa, wherein the output image clearly (viewably) depicts the dark region in the brighter surrounding or vice versa.

BRIEF DESCRIPTION OF THE INVENTION

In an embodiment, a digital image processing method is provided, wherein the method includes the actions of (i) segmenting a data set of an image to be processed, based on predetermined conditions; (ii) generating a MIP of the segmented data set; (iii) closing-by-reconstruction of above said segmented data set in parallel to action (ii); (iv) combining the result of action (i) with result of action (iii) by a logical AND function; and (v) replacing pixels of undesired intensity (information) in result of action (ii) with pixels of desired intensity from result of action (iv).

In another embodiment, a digital image processing system is provided, wherein the system comprises a computer programmed for performing the actions of (i) segmenting a data set of an image to be processed, based on predetermined conditions; (ii) generating a MIP of the segmented data set (iii) closing-by-reconstruction of above said segmented data set in parallel to action (ii); (iv) combining the result of action (i) with result of action (iii) by a logical AND function; and (v) replacing pixels of undesired intensity (information) in result of action (ii) with pixels of desired intensity from result of action (iv).

In yet another embodiment, a digital image processing system is provided, wherein the system includes a means for reading the data set of an image to be processed. A means for processing the image data set forms an output image, wherein the means is programmed to combine Maximum Intensity Projection and a Minimum Intensity Projection for forming the output image.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those of ordinary skill in the art to practice the embodiments, and it is to be understood that other embodiments may be utilized and that logical, mechanical, electrical and other changes may be made without departing from the scope of the embodiments. The following detailed description is, therefore not to be taken in a limiting sense.

Figure 1:
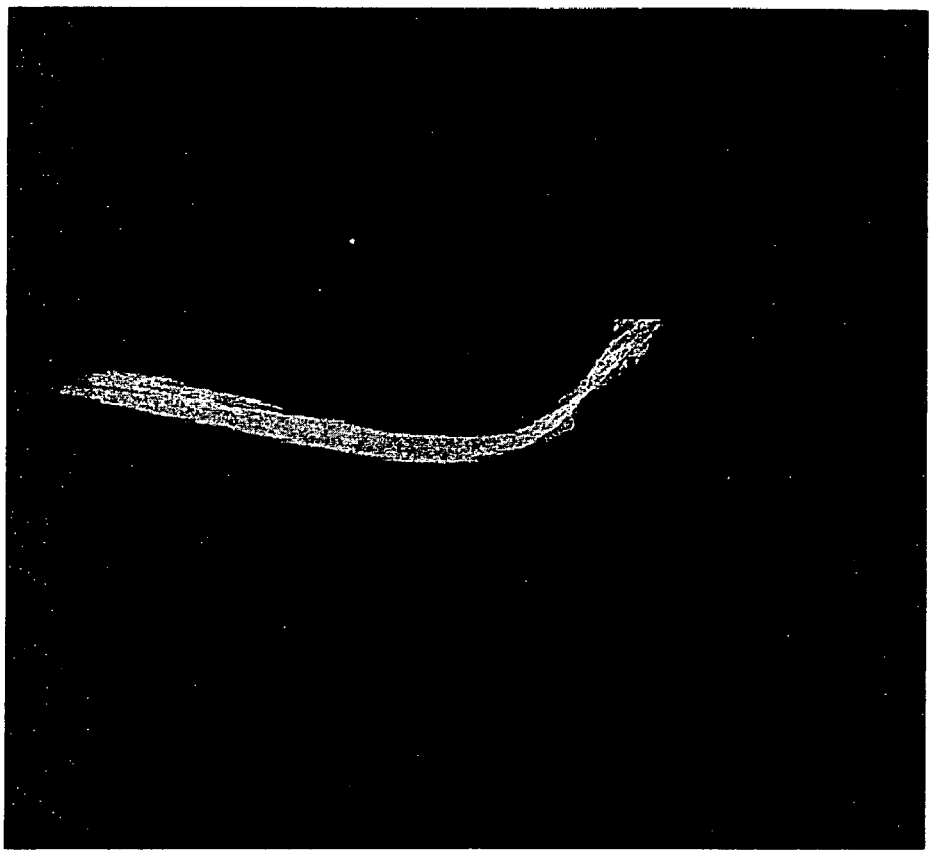
FIG. 1 shows a prior art radiographic image generated by Maximum Intensity Projection.

While diagnosing a dark region in a bright surrounding e.g. a dark blood vessel in a bright spine, or a bright region in a dark surrounding e.g. a stenosis in a blood vessel, use of maximum intensity projection for processing an image data set, results in a loss of a substantial amount of valuable image data corresponding to the dark or bright region. (see FIG. 1).

Various embodiments of this invention provide a method and system digital image processing in medical imaging, e.g. for use in an X-ray imaging, CT scanning, Magnetic Resonance Imaging, vascular imaging, etc. However the embodiments are not so limited, and may be implemented in connection with other systems such as, for example, imaging of materials and structures, etc.

In general, one embodiment of this invention relates to a system for digital image processing, wherein the system includes combining maximum intensity projection and minimum intensity projection for obtaining an output image wherein the output image is substantially clear to visualize an anatomy of dark region in a bright surrounding and vice versa.

In particular, the system includes a reading part that reads a data set of an image to be processed and a processing part (a means for processing) for processing the read data set to form an output image, wherein the processing part is programmed to combine the maximum intensity projection and minimum intensity projection for forming the output image. The image is displayed in a display unit.

In one example, the system is configured for visualizing and/or analyzing a blood vessel in a spine, wherein the blood vessel is substantially clear in the output image.

Other examples include analysis of stenosis in a blood vessel, visualizing dark blood vessel in a skull, etc.

Figure 2:
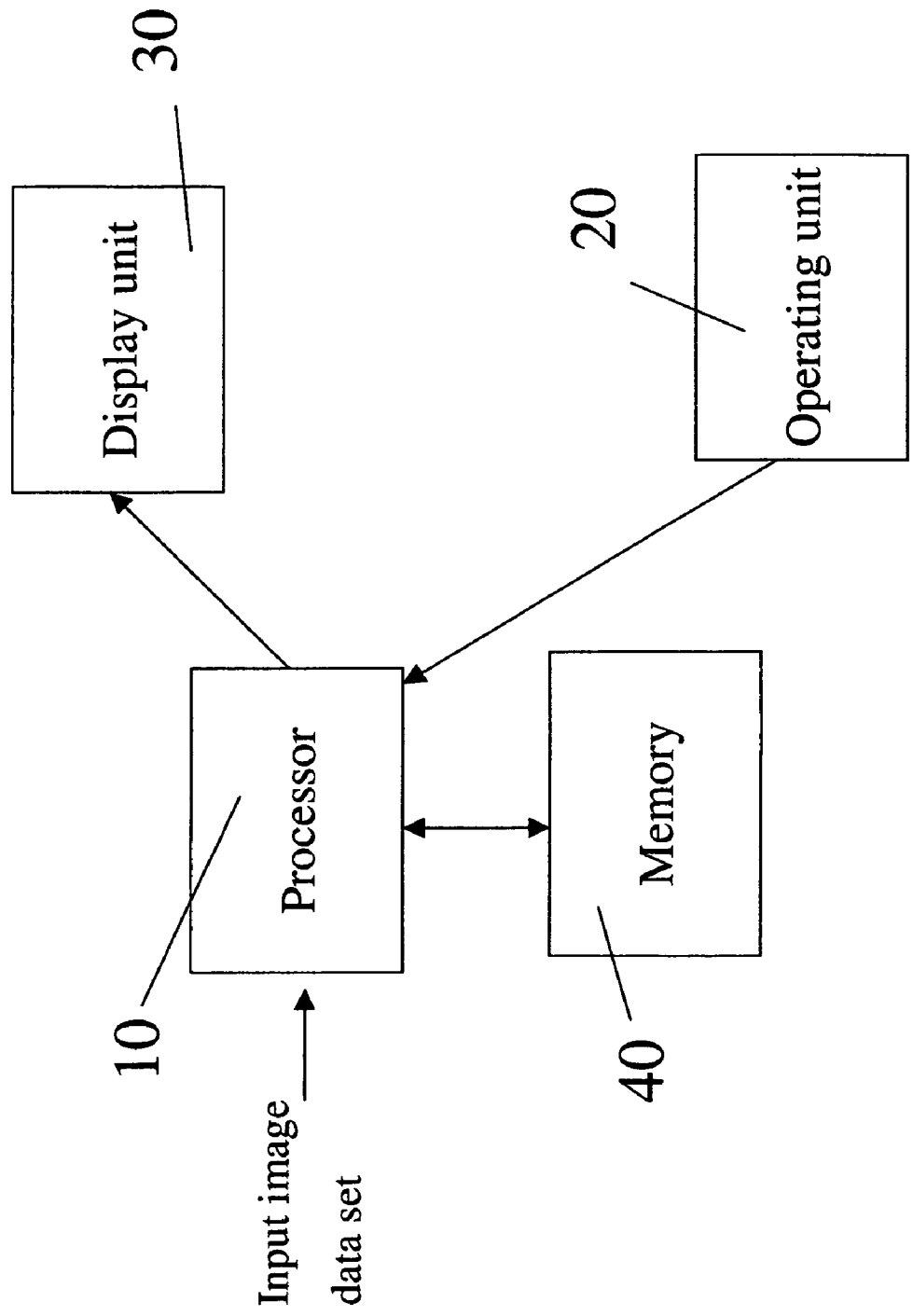
FIG. 2 shows a block diagram of a system for digital image processing according to one embodiment of the present invention.

FIG. 2 shows a block diagram of the system for digital image processing according to one embodiment of this invention, wherein the system comprises a processor 10 configured for reading and processing an input data set of an image to be processed. An operating unit 20 is connected to the processor 10 for instructing the processor 10 for reading and processing the input data set. The operating unit 20 assists in interactive operation of the processor 10 by a user. A display unit 30 is connected to the processor 10 for displaying the output image from the processor 10. A memory 40 storing a program for running in the processor 10 is connected to the processor 10.

Figure 3:
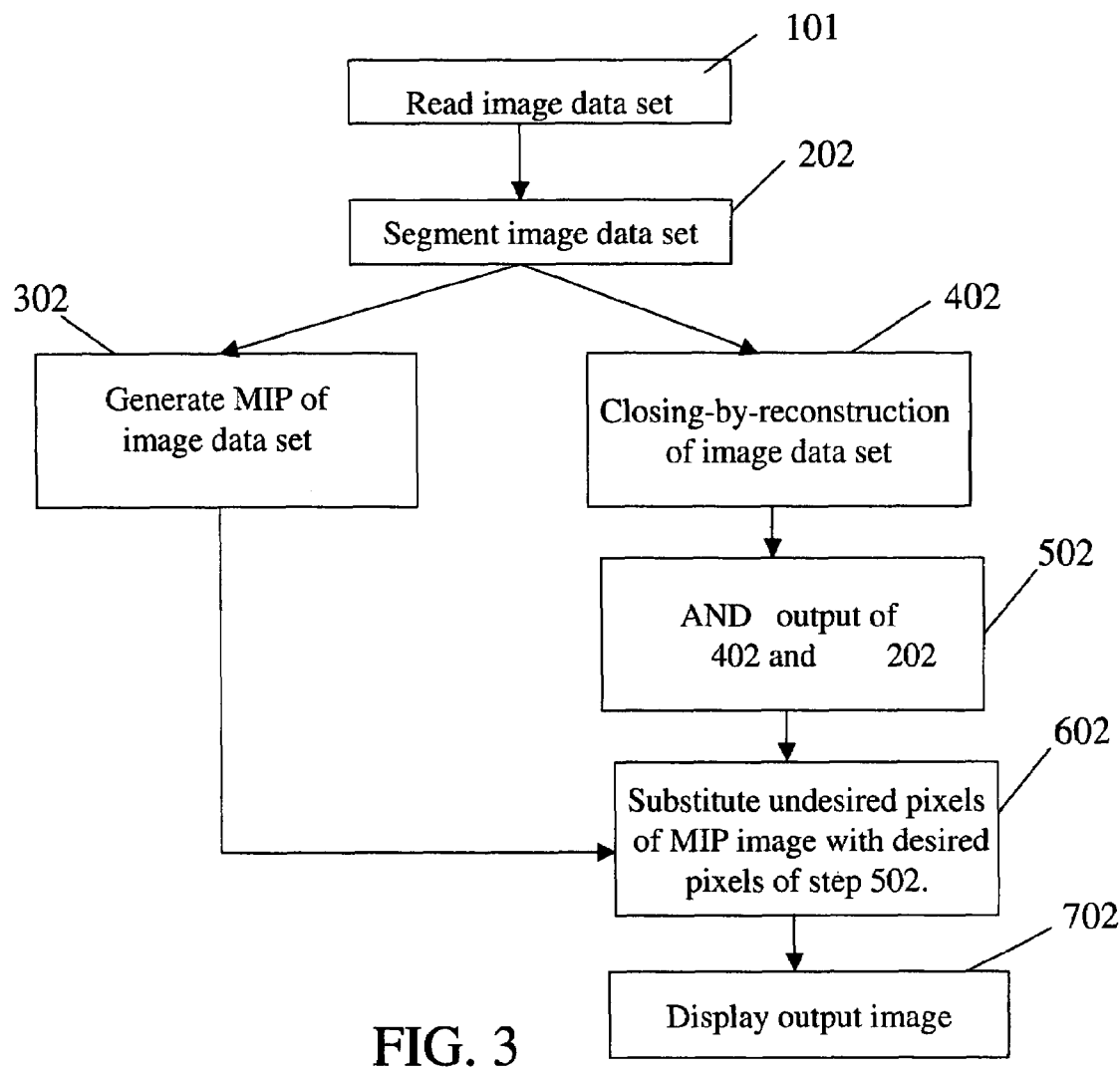
FIG. 3 shows a flow chart of method actions of digital image processing according to one embodiment of this invention.

FIG. 3 shows a flowchart of method actions performed by the system according to one embodiment of this invention.

As illustrated, at action 101, a data set of an image to be processed is read. For example, the data set may represent a blood vessel in a spine, a stenosis in a blood vessel, etc.

At action 202, the read data set is segmented based on at least one of a region of interest (ROI) or an application.

In one example, if the application is directed to viewing a stenosis in a blood vessel, then the blood vessel is segmented.

In another example, if the application is directed to viewing a dark blood vessel in a bright spine, then the spine is segmented.

In an embodiment, the region of interest is selected manually by the user or set to automatically select the region of interest by a computer program.

For example, segmentation is carried out by region growing wherein, an arbitrary seed pixel is chosen and compared with neighbouring pixels. A region is grown from the seed pixel by adding-in neighbouring pixels that are similar, thereby increasing the size of the region.

It should be noted that the data set of the image may be a two dimensional (2D) or volume data set.

At action 302, the segmented data set is subjected to a maximum intensity projection.

At action 402, in parallel to action 302, the segmented data set is subjected to a closing-by-reconstruction.

As illustrated, at action 502, the data set subjected to the closing-by-reconstruction is combined with segmented data set (result of action 202) by logical AND function.

It should be noted that generating maximum intensity projection and closing-by-reconstruction may be carried out on original data set without performing segmentation. However, such direct execution may not result in an image with significant clarity and is time consuming.

At action 602, the pixel of undesired intensity in the maximum intensity projection image (result of action 302) is replaced by the pixels of desired intensity obtained from (action 502) logically combining the data set subjected to closing-by-reconstruction and the segmented data set.

It should be noted that the pixel of undesired intensity is defined based on the application. For example, if the application is directed to viewing of dark region in a bright surrounding, then bright pixels are referred to as pixels of undesired intensity and dark pixels are referred to a pixels of desired intensity.

If the application is directed to viewing of a bright region in a dark surrounding, then the dark pixels are referred to as pixels of undesired intensity and bright pixels are referred to as pixels of desired intensity.

At action 702, the output image is displayed in the display unit 30.

Figure 4:
FIG. 4 shows a radiographic image of a blood vessel in a spine according obtained by the method actions of FIG. 3 according to one embodiment of the present invention.

FIG. 4 shows an example of an output image obtained using the method shown in FIG. 3. The output image gives a substantially clear view of a dark blood vessel in a bright spine.

Thus, various embodiments of this invention describe a system for digital image processing in medical imaging. Further embodiments of this invention describe a method of digital image processing in medical imaging.

While this invention has been described with various specific embodiments, it will be obvious for a person skilled in the art to practice the invention with modifications. However, all such modifications are deemed to have been covered within the scope of the claims.

What is claimed is:

1. A method for digital image processing, said method comprising the actions of:
   (i) segmenting a data set of an image to be processed, based on predetermined conditions;
   (ii) generating a maximum intensity projection of the segmented data set;
   (iii) closing-by-reconstruction of said segmented data set in parallel to action (ii);
   (iv) combining the result of action (i) with result of action (iii) by logical AND function; and
   (v) replacing pixels of undesired intensity in result of action (ii) by pixels of desired intensity from result of action (iv).

2. The method according to claim 1 wherein action (i) further comprises segmenting the data set of the image based on at least one of a region of interest and an application.

3. The method according to claim 2 wherein the region of interest is selected by at least one of a manual and an automated procedure.

4. The method according to claim 2 wherein the application further comprises at least one of visualizing a low intensity region surrounding a high intensity region and vice versa.

5. The method according to claim 4 wherein the application further comprises analyzing an anatomy.

6. The method according to claim 5 wherein the anatomy further comprises a stenosis in a blood vessel.

7. The method according to claim 1 wherein the segmented data set is either a two dimensional or volume data set.

8. A system for digital image processing, comprising:
   a processor;
   said processor programmed for:
   (i) segmenting a data set of an image to be processed, based on predetermined conditions;
   (ii) generating a maximum intensity projection of the segmented data set;
   (iii) closing-by-reconstruction of said segmented data set in parallel to action (ii);
   (iv) combining the result of action (i) with result of action (iii) by logical AND function; and
   (v) replacing pixels of undesired intensity in result of action (ii) by pixels of desired intensity from result of action (iv).

9. The system according to claim 8 wherein the data set of the image is segmented based on at least one of a region of interest and an application.

10. The system according to claim 9 wherein the region of interest is selected by at least one of a manual and an automated procedure.

11. The system according to claim 10 wherein the application further comprises at least one of visualizing a low intensity region surrounding a high intensity region and vice versa.

12. The system according to claim 11 wherein the application further comprises analyzing an anatomy.

13. The system according to claim 12 wherein the anatomy further comprises a stenosis in a blood vessel.

14. The system according to claim 8 wherein the data set further comprises at least one of two dimensional and volume configurations.

15. A system for digital image processing, comprising:
   a means for reading an image data set; and
   a means for processing read image data set to form an output image, wherein said means for processing is programmed to combine maximum intensity projection and a minimum intensity projection for forming the output image.

16. The system according to claim 13 wherein the means for processing is programmed to segment the image data set before combining maximum intensity projection and a minimum intensity projection.

17. The system according to claim 16 wherein the means for processing is programmed to segment the image data set based on at least one of a region of interest and an application.

18. The system according to claim 15 wherein the output image further comprises at least one of two dimensional and volume configurations.

19. The system according to claim 15 wherein the means for processing the image data is configured for imaging an anatomy, wherein the anatomy further comprises at least one of a low intensity region surrounding a high intensity region and vice versa.

20. The system according to claim 15 wherein the imaging further comprises analysis of stenosis in a blood vessel.

* * * * *